United States Patent
Wilms et al.

(10) Patent No.: US 9,877,055 B2
(45) Date of Patent: Jan. 23, 2018

(54) COMPUTER SYSTEM AND METHOD FOR STREAMING VIDEO WITH DYNAMIC USER FEATURES

(71) Applicant: Google Inc., Mountain View, CA (US)

(72) Inventors: Kurt Wilms, San Francisco, CA (US); Bryce Gibson Reid, Menlo Park, CA (US); Andrea Zvinakis, San Francisco, CA (US); Matthew Turner Smith, Alameda, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/974,323

(22) Filed: Dec. 18, 2015

(65) Prior Publication Data

US 2017/0180772 A1    Jun. 22, 2017

(51) Int. Cl.
*H04N 21/254* (2011.01)
*H04N 21/262* (2011.01)
*H04N 21/258* (2011.01)
*H04N 21/2668* (2011.01)
*H04N 21/442* (2011.01)
*H04N 21/414* (2011.01)
*H04N 21/234* (2011.01)
*H04N 21/466* (2011.01)
(Continued)

(52) U.S. Cl.
CPC . *H04N 21/26258* (2013.01); *H04N 21/23424* (2013.01); *H04N 21/254* (2013.01); *H04N 21/25866* (2013.01); *H04N 21/25891* (2013.01); *H04N 21/2668* (2013.01); *H04N 21/2743* (2013.01); *H04N 21/41407* (2013.01); *H04N 21/431* (2013.01); *H04N 21/44218* (2013.01); *H04N 21/44222* (2013.01); *H04N 21/4668* (2013.01); *H04N 21/478* (2013.01); *H04N 21/4826* (2013.01); *H04N 21/6587* (2013.01); *H04N 21/8133* (2013.01); *H04N 21/485* (2013.01)

(58) Field of Classification Search
CPC combination set(s) only.
See application file for complete search history.

(56) References Cited

U.S. PATENT DOCUMENTS

| | | | |
|---|---|---|---|
| 2003/0070182 A1* | 4/2003 | Pierre | H04N 5/76 725/135 |
| 2013/0110978 A1* | 5/2013 | Gordon | H04N 21/2665 709/218 |

(Continued)

OTHER PUBLICATIONS

International Search Report and Written Opinion of the International Searching Authority or Declaration for PCT Application No. PCT/US2016/062282 dated Feb. 7, 2017, 13 pages.

*Primary Examiner* — Kieu Oanh T Bui
(74) *Attorney, Agent, or Firm* — Lowenstein Sandler LLP

(57) ABSTRACT

A system and method for streaming video with dynamic user features enable content distribution systems to increase a user's total watch time. A user behavior server proposes additional watch recommendations to a user in response to detecting certain user behavior. Autoplay and autoscroll functionality is provided that permits a user to browse a video feed during playback of selected content. Global play and pause modes are disclosed that allow a user to select a preferred playback mode and have that mode persist across session and application launches.

20 Claims, 6 Drawing Sheets

(51) Int. Cl.
    *H04N 21/2743*     (2011.01)
    *H04N 21/431*     (2011.01)
    *H04N 21/478*     (2011.01)
    *H04N 21/482*     (2011.01)
    *H04N 21/6587*     (2011.01)
    *H04N 21/81*     (2011.01)
    *H04N 21/485*     (2011.01)

(56) References Cited

U.S. PATENT DOCUMENTS

| | | | |
|---|---|---|---|
| 2013/0291018 A1* | 10/2013 | Billings | H04L 51/32 |
| | | | 725/46 |
| 2014/0020017 A1* | 1/2014 | Stern | H04N 21/23611 |
| | | | 725/34 |
| 2014/0274355 A1 | 9/2014 | George et al. | |
| 2014/0282786 A1* | 9/2014 | Lajoie | H04N 21/2743 |
| | | | 725/115 |
| 2015/0150046 A1* | 5/2015 | Maharajh | G06F 17/30035 |
| | | | 725/34 |
| 2015/0163551 A1 | 6/2015 | Yong et al. | |

\* cited by examiner

COMPUTER SYSTEM AND METHOD FOR STREAMING VIDEO WITH DYNAMIC USER FEATURES

BACKGROUND

1. Field of Art

The disclosure herein generally relates to the field of systems for viewing streamed videos, and specifically to processing video recommendations made to a user during an inline playback mode in a content distribution system mobile application.

2. Description of the Related Art

Websites providing streamed user video content such as YOUTUBE™ have become hugely popular in recent years. Many of these websites now have corresponding mobile applications that allow users to browse and view content on their mobile devices, such as their smartphone or tablet. These facilities generally provide an interface that allows users to both upload their own video content and search a database of all such uploaded video content for videos of interest. As well as the many user-curated video facilities, there are also numerous facilities that provide host controlled video content, such as HULU™. To aid users in deciding which video or videos to watch from the thousands, or even millions, in its database, these applications may provide users with watch recommendations.

These facilities seek to increase a user's watch time by proposing additional recommended content based on the content the user has previously viewed. Additionally, such facilities may make recommendations to the user after the user has interacted with the content. For example, a user might comment on or "like" a video, and such interaction may prompt the application to display related content to the user.

While these facilities provide a helpful service by proposing additional content to the user after the user has finished watching or has interacted with the content, it would be desirable to provide additional watch suggestions to the user while the user is still actively engaging with the content in inline playback mode. Exposing the user to additional recommendations while the user is actively engaging with the content may increase the user's total watch time by bringing the suggestions of the watch page to the user even if the user does not visit the watch page directly. Such a system would further be advantageous because a user who might otherwise navigate away from the page due to dissatisfaction with the current content might instead remain on the application page if presented with additional watch recommendations.

Current facilities also attempt to increase a user's watch time by automatically playing additional content after the user-selected content has ended. Such autoscroll functionality is generally only available in a content distribution system's website. Additionally, when playback of user-selected content through these facilities begins, users are not able to browse other content on the webpage or application page without playback of the current content stopping. Given the pervasive nature of smartphones and other mobile devices, it would be desirable to provide such autoscroll functionality on a content distribution system's mobile application. It would further be advantageous to reduce the friction between browsing and watching by allowing a user to browse other content on the mobile application during playback of the current content.

Additionally, many current facilities autoplay videos when a user scrolls through videos in a feed. Such defaulted autoplay can be disruptive to some users and, in the aggregate, can consume a significant portion of the user's mobile data allowance. It would therefore be desirable to allow the user to select a preferred playback experience by choosing between click-to-play, where content will not begin playback unless and until a user explicitly selects it, and inline playback, where content automatically begins to play as a user browses. It would further be desirable for the facility to save the user's preferred playback experience such that the selected mode persists across sessions and facility launches.

SUMMARY

A system processes recommended content for presentation to a user based on implicit video interest signals, generates a list of recommended content based on the content that the user is currently watching in inline playback mode, and exposes the recommended content to the user on the same page as the content that the user is currently watching.

A user of the mobile application selects content and begins watching that content in inline playback mode. In one embodiment, the user watching the content for a certain threshold of time triggers the system to generate and display additional watch recommendations. In another embodiment, the decision to display additional recommendations to the user depends on whether the user stops performing additional tasks during playback of the current content. In one use case, the system provides an additional watch recommendation to the user if the user does not scroll the application page, navigate to a different part of the application page, or click elsewhere on the page during playback of the current video. In still another, the system displays additional recommendations if the current content is a related video to content that the user previously watched.

Once the system displays additional content recommendations to the user, the system sends a request to the content that is currently being viewed to retrieve the additional content recommendations associated with the current video. The system applies an algorithm to choose a set of the most relevant content based upon characteristics of the current video. In one embodiment, the system filters out content that the user has already seen. In another embodiment, the relevant content is content that is about the same topic. In a further embodiment, the relevant content is content that is from the same uploader. In still another embodiment, the relevant content is content that other users have watched after watching the current video.

The system then exposes the additional content recommendations to the user on the same page as the currently viewed content using various user interface elements. In one embodiment, the system replaces the content below the current content using the same user interface. In another embodiment, the system displays a carousel of video thumbnails that the user may scroll through. In still another embodiment, the system displays the videos as static thumbnails below the currently playing content.

The system also includes an autoscroll and autoplay subsystems that allow the user to opt-in to an experience where videos play in inline playback mode as the user browses the mobile application page, thus reducing the friction between browsing and watching. In one embodiment, when the user selects a video and playback begins, the system allows the user to browse the page and continues playback of the selected video. In another embodiment, the user need not select the initial video; rather, the system automatically begins to play a video when the user scrolls the application page to that video, and the video continues to play while the user browses the page.

Once the current video ends, a content server automatically transitions playback from the current video to the next video in the feed, enabling the user to continue watching videos from the user's feed without interaction. In one embodiment, the autoscroll subsystem operates when the application is in normal viewing mode, meaning that the user is exposed to other content on the same page as the current video. In another embodiment, the autoscroll subsystem operates when the application is in full-screen mode, meaning that the current video occupies the entire application page, and the user is not exposed to other content while watching the current video. In either embodiment, if the user does not want the next video to play, the user scrolls up or down the page to stop autoscroll such that when the current video ends, the system will not automatically begin playback of the next video in the user's feed.

The system also allows the user to select a preferred playback experience when navigating the user's browsing feed. In one embodiment, the playback mode is defaulted to inline playback, in which videos automatically begin to play as the user browses the feed. In another embodiment, the playback mode is defaulted to click-to-play, in which a video does not begin to play unless and until a user selects the video by clicking on it.

In either embodiment, the user is able to switch the playback experience to the other mode. If the application is in inline playback mode, and the user pauses any video in the feed, the application will switch to click-to-play mode, such that if the user scrolls to another video in the user's feed, the video will not autoplay, and the user will have to explicitly tap the video to begin playback. This playback experience will be referred herein to as global pause mode. When the application is in global pause mode, the system will display an indicator that the video is paused. In one embodiment, this indicator is a triangle overlaying the video thumbnail. If the user taps the indicator while the video is in global pause mode, the video will begin playback.

If the application is in click-to-play mode, the user tapping on a video to begin playback puts the application in inline playback mode, such that videos autoplay as the user scrolls through the feed. This playback experience will be referred to as global play mode.

In either embodiment, the preferred mode will persist across sessions and application launches, such that if the user exits the application while it is in global pause mode, the application will remain in global pause mode when the user relaunches the application.

Corresponding methods and computer program products are also disclosed. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosed embodiments have other advantages and features that will be more readily apparent from the detailed description, the appended claims, and the accompanying figures (or drawings). A brief introduction of the figures is below.

The figures depict embodiments of the disclosed system or method for purposes of illustration only. One skilled in the art will readily recognize from the following description that alternative embodiments of the structures and methods illustrated herein may be employed without departing from the principles described herein.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Environment Architecture

Figure 1:
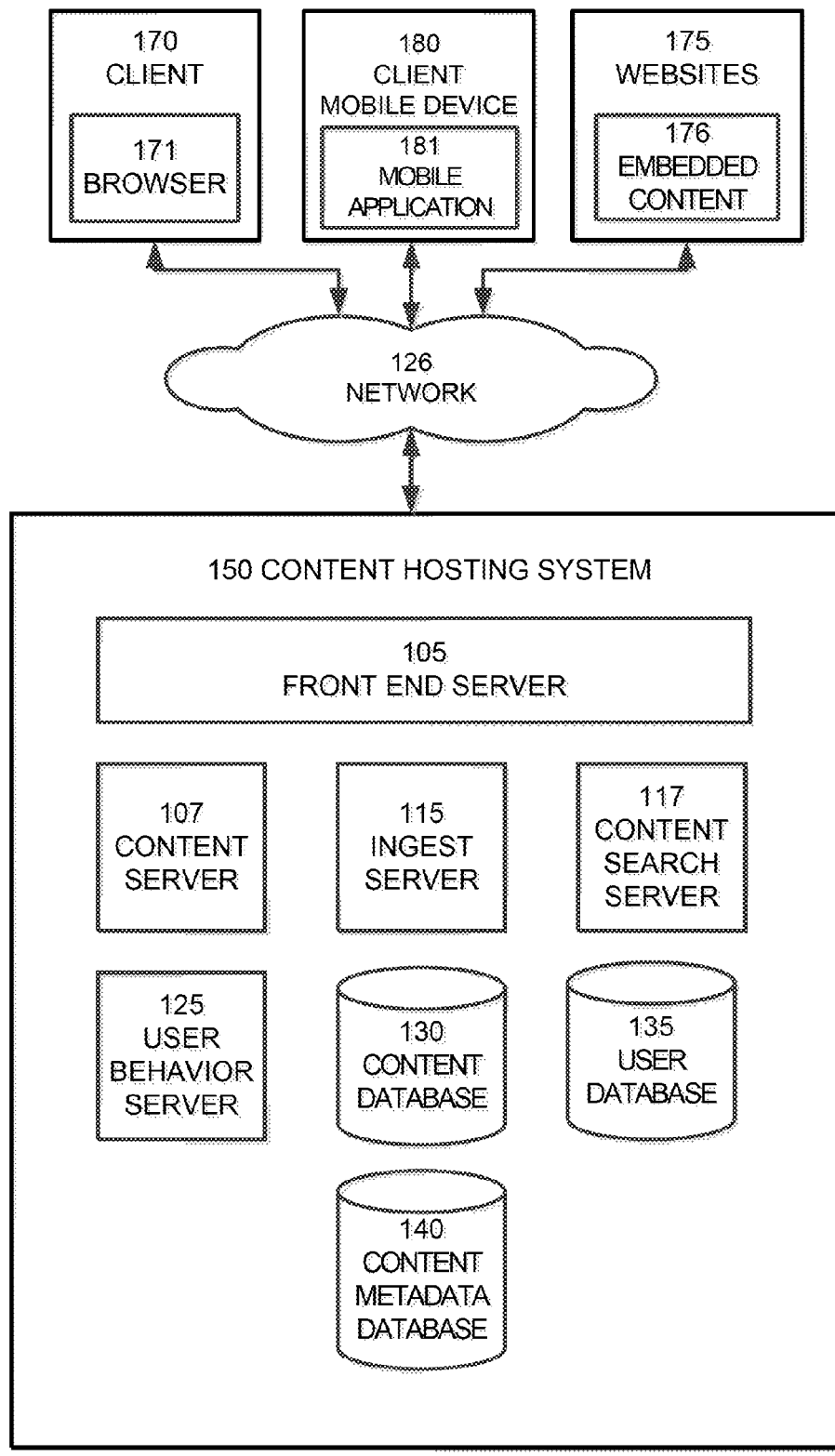
FIG. 1 shows a block diagram illustrating one embodiment of an environment configurable for proposing recommended videos to a user of a mobile application during watch in inline playback mode.

FIG. 1 shows a block diagram of an example environment for proposing recommended videos to a user during watch. A content hosting system 150 comprises a front end server 105, a content server 107, an ingest server 115, a content search server 117, a user behavior server 125, a content database 130, a user database 135, and a content metadata database 140. In one embodiment, content hosting system 150 is configured (i.e., adapted) to communicate with a client 170 using a browser 171 and third party websites 175 containing embedded content 176 via the network 126. The content hosting system 150 may also be configured (i.e., adapted) to communicate with a client mobile device 180 through a mobile application 181 via the network 126.

For clarity, conventional subsystems, such as firewalls, load balancers, application servers, failover servers, site management tools, and so forth are not shown.

The content hosting system 150 is capable of hosting and serving any type of content, including any combination of text, music, video, graphics, or the like, without limitation. The content hosting system 150 can be implemented as a blog site, a news media outlet, a forum, an ecommerce site, a video sharing site, a file sharing service, or the like, again without limitation. A suitable content hosting system 150 for implementation of the system is the YOUTUBE™ website, found at www.youtube.com; other websites that facilitate proposing recommended videos to users during watch are known as well, and can be configured to operate according to the teachings disclosed herein. It will be understood that the term "website" represents any system configured for uploading and downloading content and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

Each of the various servers is implemented as a server program executing on a server-class computer comprising a CPU, a memory, network interface, peripheral interfaces, and other well-known components. Each type of server may optionally comprise multiple server-class computers to handle scalable data. The computers themselves preferably run an open-source operating system such as LINUX, and have generally high performance CPUs, 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

In one embodiment, each client 170 executes a browser 171, and can connect to the front end server 105 via the network 126. While only a single client 170 and browser 171 are shown, it is understood that very large numbers (e.g., millions) of clients are supported and can be in communication with the content hosting system 150 at any time. The browser 171 can include a content player (e.g., Flash™ from Adobe Systems, Inc.), or any other player configured for the content file formats used in the content hosting system 150.

In another embodiment, each client mobile device 180 executes a mobile application 181, and can connect to the front end server 105 via the network 126. While only a single client mobile device 180 and mobile application 181 are shown, it is understood that very large numbers (e.g., millions) of client mobile devices are supported and can be in communication with the content hosting system 150 at any time. The mobile application 181 can include a content player (e.g., Flash™ from Adobe Systems, Inc.), or any other player configured for the content file formats used in the content hosting system 150.

Users access content from the system 150 via a user interface provided by the front end server 105 that allows the users to interact with the content hosting system 150. By loading the user interface in browser 171 or mobile application 181, a user locates content by browsing a catalog of website contents, conducting searches on keywords, reviewing content lists from other users or the system administrator (e.g., collections of videos forming channels), or viewing content associated with particular user groups (e.g., communities). The browser 171 and mobile application 181 can also access a content file indirectly, for example, via an embedded video content 176 that is accessed via an embedded hyperlink in a third party website 175.

Users can also search for content on the user interface based on keywords, tags, or other metadata. In one embodiment, these requests are received as queries in the user interface provided by the front end server 105 and provided to the content search server 117, which searches the content database 130 for content that satisfies the queries. The content search server 117 supports searching on any fielded data for content, including its title, description, tags, author, category, comment, and so forth. The content server 107 retrieves content selected by the content search server 120 from the content database 130, which is formatted into a file for transmission to the client 170 or client mobile device 180 via the content server 107.

The user interface provided by the front end server 105 also contains a user behavior server 125 that detects user behavior and determines, based on that behavior, whether to provide additional content recommendations to the user. In one embodiment, the user watching the content for a certain period of time triggers the user behavior server 125 to provide additional watch recommendations. For example, the user behavior server 125 assigns a cut-off point for each video stored in the content database 130 based on a history of other users watching that video. If the user meets or exceeds the video cut-off point, the user behavior server 125 provides additional content recommendations to the user. In another embodiment, whether the user behavior server 125 displays additional content recommendations to the user depends on the user's actions during playback of the selected content. For example, if the user does not scroll the application page, navigate to a different part of the page, or click on another part of the page, the user behavior server 125 provides additional content recommendations. In still another embodiment, the user behavior server 125 displays additional content recommendations if the current content is related to content that the user previously watched, based on information stored in the content metadata database 140.

Once the user behavior server 125 displays additional content recommendations to the user, the user behavior server 125 queries the selected content metadata for the selected content's recommendations. The user behavior server 125 uses an algorithm to select the most relevant content to display to the user based upon characteristics of the current video. In one embodiment, the user behavior server 125 filters out content that the user has already seen. In another embodiment, the relevant content is content that is about the same topic. In a further embodiment, the relevant content is content that is from the same uploader. In still another embodiment, the relevant content is content that others have watched after watching the current video.

The user interface also displays media assets, content related to a media asset, such as a title, contributor of the media asset, and comments generated by users to the media asset. The user interface may optionally display content related to a user, for example, a user identifier, user profile information, recent comments generated by the user, and media assets contributed by the user (if any). A person skilled in the art will appreciate that the type of content displayed by the user interface may be customized and/or personalized, such that each user or media asset is shown in a somewhat different user interface. Moreover, a viewer of the user interface provided by the front end server 105 can customize the page displayed therein to show different content items according to the viewer's preferences and/or needs.

Users of the client 170 and browser 171, as well as client mobile device 180 and mobile application 181 can upload content (which can include, for example, video, audio, images, documents, applications, etc. or any combination thereof) to the content hosting system 150 via the network 126. In one embodiment, the uploaded content is processed by an ingest server 115, which processed the content for storage in the content database 130. This processing can include appropriate transformations, depending on the type of content being uploaded. For example, for video content, the processing can include format conversion (transcoding), compression, metadata tagging, and other data processing. An uploaded media content file is associated with the uploading user (i.e., the media contributor), and the user's profile information is updated in the user database 135 as needed.

For purposes of convenience and the description of one embodiment, the uploaded content will be referred to as "content," "content files," or "content items." Content is displayed on pages, screens, or other representations. Each uploaded content item is assigned to a content identifier (id) when it is processed by ingest server 115. The content database 130 is used to store the ingested content.

The content metadata database 140 stores metadata information for the content, including data such as title, author, content description, keywords, tags, and the like. Additionally, the content metadata database 140 stores information about the user responsible for the comment, geographic and temporal information related to the posting of the comment, a spam score to reflect the likelihood that the comment is spam, a rating of the comment by other users, the type of comment (e.g., an original post or a reply post), and any other information useful to the content hosting system 150.

Process for Proposing Recommended Videos During Watch

Figure 2:
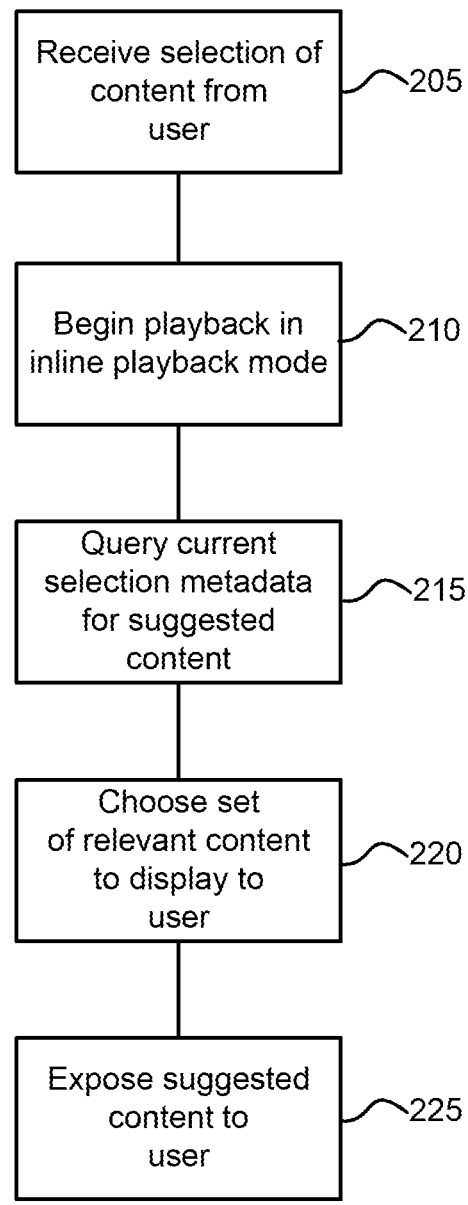
FIG. 2 illustrates a flowchart of an example process for proposing recommended videos to a user of a mobile application during watch in inline playback mode.

FIG. 2 illustrates a flowchart of an exemplary process for proposing recommended videos to a user of a mobile application during watch in inline playback mode. In the illustrated embodiment, the content item is a video; however, the process described herein is fully applicable to other digital content such as audio files, images, animations, or text. Further, the functionality described in conjunction with FIG. 2 is performed by the user behavior server 125; however, in other embodiments, any suitable component or combination of components may perform the functionality described in conjunction with FIG. 2. Additionally, in some embodiments, different and/or additional steps than those identified in FIG. 2 may be performed or the steps identified in FIG. 2 may be performed in different orders.

FIG. 2 illustrates an example process for proposing recommended videos to a user of a mobile application during watch in inline playback mode. The process begins by the front end server 105 receiving 205 a selection of content from the user. In one embodiment, the selected content is stored in the content database 130. The content server 107 begins playback 210 of the selected content to the user in inline playback mode.

The user behavior server 125 queries 215 the selected content metadata for additional watch recommendations. In one embodiment, these recommendations include content related to the selected content based on keywords, tags, or other metadata, and are retrieved from the content metadata database 140.

The user behavior server 125 chooses 220 a set of relevant content to display to the user. The user behavior server 125 applies an algorithm to choose a set of the most relevant content. In one embodiment, the user behavior server 125 filters out content that the user has already watched. In another embodiment, the user behavior server 125 filters out content that the user has previously rated or commented on.

Once the user behavior server 125 chooses a set of suggested content to display to the user, the content server 107 exposes 225 the suggested content to the user using various user interface elements. In one embodiment, the content server 107 replaces the content below the currently playing video with the suggested content using the same user interface. In another embodiment, the content server 107 exposes a carousel of video thumbnails to the user. In still another embodiment, the content server 107 displays the videos to the user as static thumbnails below the currently playing video.

Autoplay and Autoscroll

Figure 3:
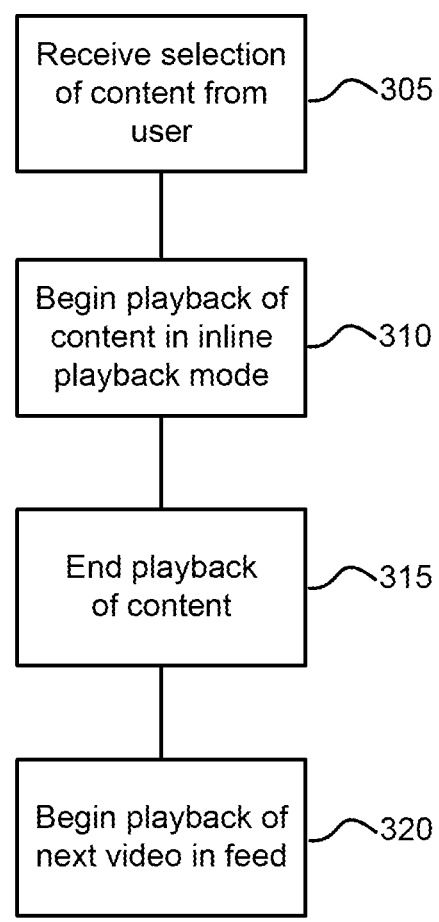
FIG. 3 illustrates a flowchart of an example process for autoscroll and autoplay of content during watch in inline playback mode.

FIG. 3 illustrates a flowchart of an example process for autoplay and autoscroll of content during watch in inline playback mode. The process begins by the front end server 105 receiving 305 a selection of content from the user. In another embodiment, the content server 107 automatically begins playback of content when the user scrolls to the content on the mobile application page. In this embodiment, the user does not select the initial video. In one embodiment, the selected content is stored in the content database 130.

The content server 107 begins playback 310 of the selected content to the user in inline playback mode. During playback, the user may browse the application page or feed without such action causing playback of the selected content to stop. For example, the user may scroll down the page to review the description of another video of potential interest, and while the user is scrolling and reading the description, the content server 107 continues playback of the selected content.

Once the content server 107 ends 315 playback of the selected content, the content server 107 automatically begins playback 320 of the next video in the video feed.

Global Play and Pause

Figure 4:
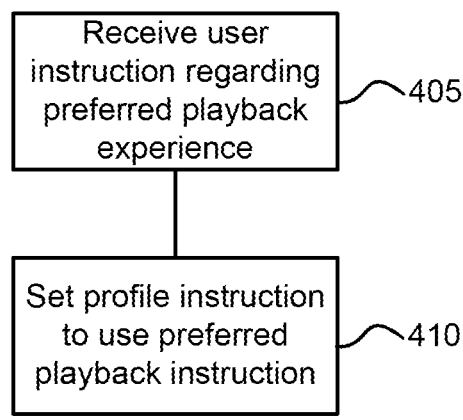
FIG. 4 illustrates a flow chart of an example of process for setting and maintaining a preferred content playback experience.

FIG. 4 illustrates a flow chart of an example of process for setting and maintaining a preferred content playback experience. The process begins by the user behavior server 125 receiving 405 a user instruction regarding the user's preferred playback experience. In one embodiment, the playback experience is defaulted to global pause mode, in which the content server 107 does not begin playback of the selected content unless and until the user explicitly instructs the content server 107 to begin playback by clicking on the content. In another embodiment, the playback experience is defaulted to global play mode, in which the content server 107 begins playback of the content automatically when the user scrolls to the content in the video feed. In either embodiment, the user may switch playback to the other mode. If the content server 107 is in global pause mode and the user instructs the content server 107 to begin playback, the user behavior server 125 changes the user's preferred playback experience to global play mode such that if the user scrolls to another video in the user's feed, the content server 107 will automatically begin playback. Conversely, if the content server 107 is in global play mode and the user pauses the current video, the user behavior server 125 changes the user's preferred playback experience to global pause mode, such that if the user scrolls to another video in the user's feed, the video will not begin playback unless and until the user explicitly instructs the content server 107 to begin playback.

The user behavior server 125 sets 410 a profile instruction to use the user's preferred playback experience. If the user closes the application and relaunches it at a later point, the user behavior server 125 will instruct the content server 107 to play content according to the user's preferred playback method.

Exemplary Embodiment

Figure 5:
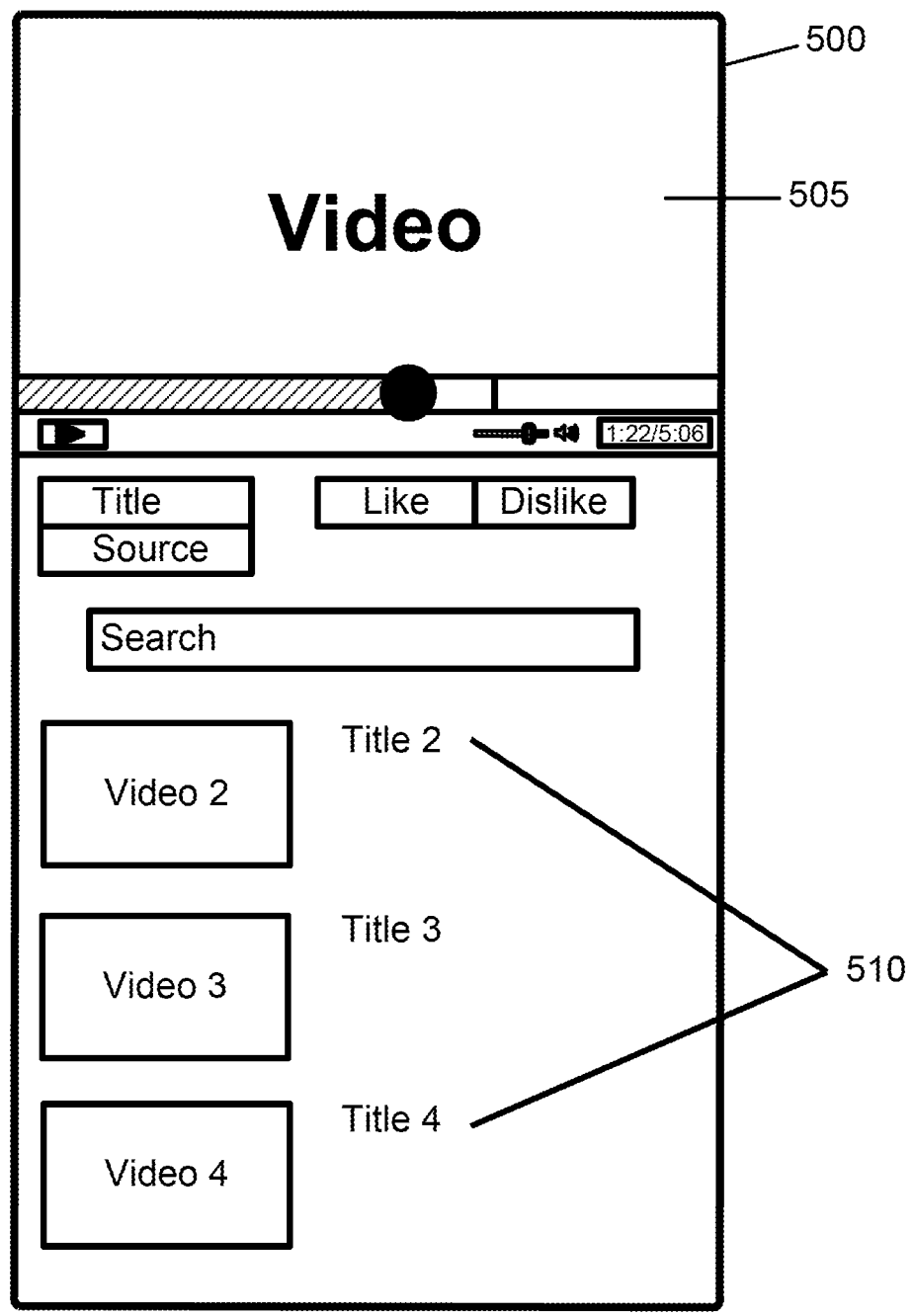
FIG. 5 is an exemplary embodiment of a video feed page in a mobile application for streaming video with dynamic user features.

FIG. 5 is an exemplary embodiment of a video feed page 500 in mobile application 181 operating on client mobile device 180 for streaming video with dynamic user features. The feed is viewed using mobile application 181, and is generated by a processor (e.g., processor 102 of FIG. 6) of a computer system such as content hosting service 150 (FIG. 1). The selected content 505 is displayed at the top of the video feed page 500. The title of the selected content 505 is displayed to provide context for the rest of the page content. The current video feed 510 is displayed in the lower part of the video feed page 500, below the selected content 505. In another embodiment, the display does not contain the selected content 505, such that thumbnails occupy the entire video feed page 500.

Video feed controls 515 are provided for the user to add and remove videos from the current video feed 510. A user may also drag and drop videos into the current video feed 510 to change the order of playback. A user may select one or more videos in the current video feed 510 and click "remove" in the video feed controls 515. The user will be prompted to confirm that they intended to remove the selected videos, and if confirmation is given, the current video feed 510 will be adjusted accordingly. If the user selects "add" from the video feed controls 515, the user is prompted to enter links to one or more videos and confirm the intention to add these videos. Once these links have been provided and the user has confirmed their intent, the current video feed 510 is updated to include the additional videos.

In a further portion of the video feed page 500, a search interface 515 is provided with which a user can search via keyword for potential additions to the current video feed 510.

Computing Machine Architecture

Figure 6:
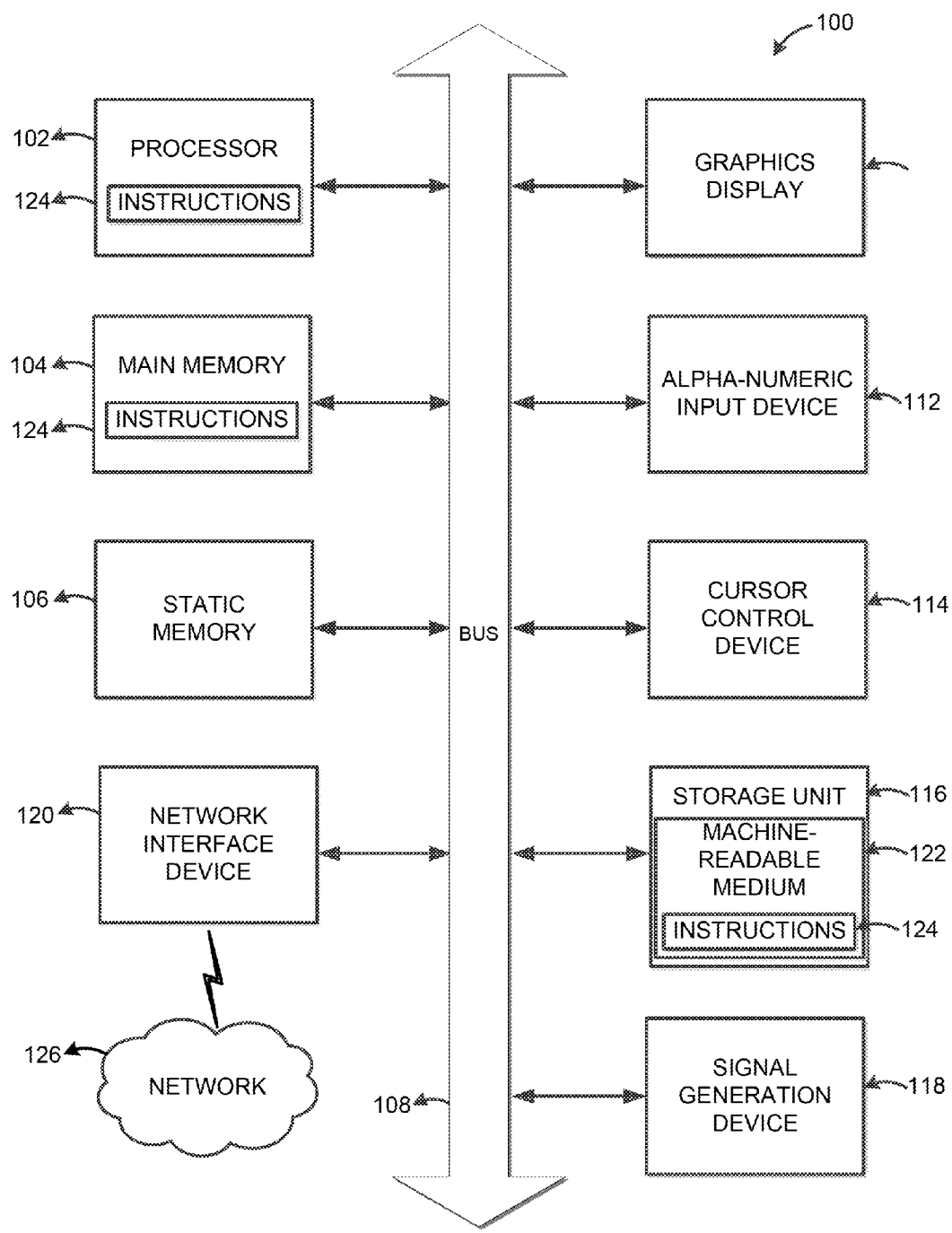
FIG. 6 illustrates one embodiment of components of an example machine able to read instructions from a machine-readable medium and execute them in a processor.

FIG. 6 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. The computer system 100 may operate as a part of a "cloud computing" environment. For example, at least some of the operations described herein may be performed by one or more cloud devices, these operations being accessible over a network (e.g., the Internet) via one or more appropriate interfaces (e.g., application program interfaces).

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108. The computer system 100 may lack some of the components shown, and the functionality described with regards to multiple components may be implemented by a single, combined component. For example, the functionality of graphics display unit 110, alphanumeric input device 112, and cursor control device 114 may be provided by a touch-screen input/output component.

The storage unit 116 includes a machine-readable medium 122 on which are stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over the network 126 via the network interface device 120. The network 126 is typically the Internet, but can be any network, including but not limited to any combination of a LAN, a MAN, a WAN, a mobile, a wired or wireless network, a private network, or a virtual private network.

While machine-readable medium 122 is shown in an example embodiment to be a single medium, the term "machine-readable medium" should be taken to include a single non-transitory medium or multiple media (e.g., a centralized or distributed database, or associated caches and servers) able to store instructions (e.g., instructions 124). The term "machine-readable medium" shall also be taken to include any non-transitory medium that is capable of storing instructions (e.g., instructions 124) for execution by the machine and that cause the machine to perform any one or more of the methodologies disclosed herein. The term "machine-readable medium further includes data repositories in the form of non-transitory solid-state memories, optical media, and magnetic media.

Although the foregoing description has focused primarily on videos for purposes of providing a concrete illustration, various embodiments may incorporate different types of digital content in different forms of playlists. In one embodiment, the content server 107 contains audio files in playlists, which may be presented through an audio player instead of a video player. It should be noted that videos may contain audio files as well. As another embodiment, the content server 107 contains images and/or animations organized in albums instead of playlists. Rather than using a video or an audio player, these images and/or animations may be presented in a slideshow, which may contain autoplay functionality (e.g., the slideshow retrieves a next image or animation after a period of time). In yet another embodiment, the digital content includes text, which may be organized into textual collections (e.g., chapters in a book, installments in a short story series, poems in an anthology). Digital content may include combinations of video, audio, images, animations, and/or text.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. To implement these operations, the content server 107 may use a non-transitory computer-readable medium that stores the operations as instructions executable by one or more processors. Any of the operations, processes, or steps described herein may be performed using one or more processors. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for a system and a process for a content sharing environment. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

What is claimed is:

1. A content hosting system comprising:
   a memory; and
   a processing device, coupled to the memory, to:
   present a feed comprising graphical representations of a plurality of videos to be played according to a current playback mode;
   responsive to a user scrolling to a graphical representation of a first video of the plurality of videos in the feed, determine that the current playback mode is an automated playback mode characterized by starting video playback without any user interaction, and begin playback of the first video in the automated playback mode;
   upon detecting user behavior with respect to the first video that indicates user interest in a different playback mode, switch the current playback mode from the automated playback mode to a pause mode characterized by requiring a user instruction before starting video playback, wherein the pause mode is to be used for playback of the plurality of videos in the feed until detecting user behavior indicating that the user is no longer interested in the pause mode; and
   responsive to a user scrolling to a graphical representation of a second video of the plurality of videos in the feed, determine that the current playback mode is the pause mode, and refrain from beginning playback of the second video until receiving a user instruction to play the second video.

2. The system of claim 1, wherein the user behavior with respect to the first video is watching the first video for a certain period of time.

3. The system of claim 1, wherein the user behavior with respect to the first video is performing other tasks during playback of the first video.

4. The system of claim 1, wherein the user behavior with respect to the first video is pausing the first video.

5. The system of claim 1, wherein the automated playback mode is further characterized by starting playback of a next video of the plurality of videos without any user interaction after the playback of the first video ends.

6. A method comprising:
   presenting a feed comprising graphical representations of a plurality of videos to be played according to a current playback mode;
   responsive to a user scrolling to a graphical representation of a first video of the plurality of videos in the feed, determining that the current playback mode is an automated playback mode characterized by starting video playback without any user interaction, and beginning playback of the first video in the automated playback mode;
   upon detecting user behavior with respect to the first video that indicates user interest in a different playback mode, switching, by a processing device, the current playback mode from the automated playback mode to a pause mode characterized by requiring a user instruction before starting video playback, wherein the pause mode is to be used for playback of the plurality of videos in the feed until detecting user behavior indicating that the user is no longer interested in the pause mode; and responsive to a user scrolling to a graphical representation of a second video of the plurality of videos in the feed, determining that the current playback mode is the pause mode, and refraining from beginning playback of the second video until receiving a user instruction to play the second video.

7. The method of claim 6, wherein the user behavior with respect to the first video is watching the first video for a certain period of time.

8. The method of claim 6, wherein the user behavior with respect to the first video is performing other tasks during playback of the first video.

9. The method of claim 6, wherein the user behavior with respect to the first video is pausing the first video.

10. The method of claim 6, wherein the automated playback mode is further characterized by starting playback of a next video of the plurality of videos without any user interaction after the playback of the first video ends.

11. A non-transitory computer-readable storage medium configured to store instructions, the instructions when executed by a processor causing the processor to:

present a feed comprising graphical representations of a plurality of videos to be played according to a current playback mode;

responsive to a user scrolling to a graphical representation of a first video of the plurality of videos in the feed, determine that the current playback mode is an automated playback mode characterized by starting video playback without any user interaction, and begin playback of the first video in the automated playback mode;

upon detecting user behavior with respect to the first video that indicates user interest in a different playback mode, switch the current playback mode from the automated playback mode to a pause mode characterized by requiring a user instruction before starting video playback, wherein the pause mode is to be used for playback of the plurality of videos in the feed until detecting user behavior indicating that the user is no longer interested in the pause mode; and responsive to a user scrolling to a graphical representation of a second video of the plurality of videos in the feed, determine that the current playback mode is the pause mode, and refrain from beginning playback of the second video until receiving a user instruction to play the second video.

12. The non-transitory computer-readable storage medium of claim 11, wherein the user behavior with respect to the first video is watching the first video for a certain period of time.

13. The non-transitory computer-readable storage medium of claim 11, wherein the user behavior with respect to the first video is performing other tasks during playback of the first video.

14. The non-transitory computer-readable storage medium of claim 11, wherein the user behavior with respect to the first video is pausing the first video.

15. The non-transitory computer-readable storage medium of claim 11, wherein the automated playback mode is further characterized by starting playback of a next video of the plurality of videos without any user interaction after the playback of the first video ends.

16. The method of claim 6, wherein the current playback mode is a default playback mode configured by the user.

17. The method of claim 6, further comprising:

upon switching the current playback mode from the automated playback mode to the pause mode, presenting an indicator graphically illustrating that the current playback mode is the pause mode.

18. The method of claim 17, wherein the indicator is presented on top of the graphical representation of the second video and is selectable to begin playback of the second video.

19. The method of claim 18, further comprising:

responsive to a user selection of the indicator, beginning playback of the second video, and switching the current playback mode from the pause mode to the automated playback mode.

20. The method of claim 19, wherein the automated playback mode is transferable to at least one of a new session or a new launch of an application that presents the feed.

* * * * *